(12) United States Patent
Tanimizu et al.

(10) Patent No.: US 8,398,952 B2
(45) Date of Patent: Mar. 19, 2013

(54) METHOD OF MANUFACTURING ALKALI METAL TITANATE AND HOLLOW BODY PARTICLE THEREOF, PRODUCT THEREOF, AND FRICTION MATERIAL CONTAINING THE PRODUCT

(75) Inventors: Koji Tanimizu, Chigasaki (JP); Naomichi Hori, Chigasaki (JP); Nobuo Kamishima, Chigasaki (JP)

(73) Assignee: Toho Titanium Co., Ltd., Chigasaki, Kanagawa (JP)

( * ) Notice: Subject to any disclaimer, the term of this patent is extended or adjusted under 35 U.S.C. 154(b) by 697 days.

(21) Appl. No.: 12/593,197

(22) PCT Filed: Mar. 27, 2008

(86) PCT No.: PCT/JP2008/056620
§ 371 (c)(1),
(2), (4) Date: Sep. 25, 2009

(87) PCT Pub. No.: WO2008/123558
PCT Pub. Date: Oct. 16, 2008

(65) Prior Publication Data
US 2010/0112350 A1 May 6, 2010

(30) Foreign Application Priority Data

Mar. 29, 2007 (JP) .................. 2007-087799
Oct. 15, 2007 (JP) .................. 2007-267542
Oct. 15, 2007 (JP) .................. 2007-267544

(51) Int. Cl.
*C01G 23/00* (2006.01)

(52) U.S. Cl. .......................... 423/598; 423/71

(58) Field of Classification Search .................. 423/598, 423/71
See application file for complete search history.

(56) References Cited

U.S. PATENT DOCUMENTS

| 6,677,041 B1 * | 1/2004 | Ogawa et al. ................. 428/402 |
| 7,901,659 B2 * | 3/2011 | Itoi .......................... 423/594.15 |
| 2001/0005547 A1 | 6/2001 | Hikichi |
| 2009/0267016 A1 * | 10/2009 | Fukuoka et al. ....... 252/62.9 PZ |

FOREIGN PATENT DOCUMENTS

| JP | 63-252927 A | 10/1988 |
| JP | 1-294553 | 11/1989 |
| JP | 6-009948 A | 1/1994 |
| JP | 6-135719 A | 5/1994 |
| JP | 2000-265157 A | 9/2000 |
| JP | 2001-172612 A | 6/2001 |
| JP | 2001-253712 A | 9/2001 |
| JP | 2002-211925 A | 7/2002 |
| JP | 2003-335519 A | 11/2003 |
| JP | 2005-519831 A | 7/2005 |
| JP | 2005-239461 A | 9/2005 |
| WO | 03076338 A1 | 9/2003 |
| WO | 2007/049764 | * 3/2007 |

OTHER PUBLICATIONS

International Search Report and Written Opinion Corresponding to PCT/JP08/056620 under date of mailing of Jun. 18, 2008.
English Language translation of International Search Report Corresponding to PCT/JP08/056620 under date of mailing of Jun. 18, 2008.

* cited by examiner

*Primary Examiner* — Steven Bos
(74) *Attorney, Agent, or Firm* — Quarles & Brady LLP

(57) ABSTRACT

The present invention is to provide a method of manufacturing a potassium titanate adapted for a friction material of a friction slide member. The present invention includes the steps of uniformly mixing an aggregate or a granulation of a titanium compound and a potassium compound with a vibration rod mill to form a mixture and sintering the mixture for reaction one another in order to manufacture a desired potassium titanate with ease and low cost.

9 Claims, 12 Drawing Sheets

20μm

—— 20 μm

METHOD OF MANUFACTURING ALKALI METAL TITANATE AND HOLLOW BODY PARTICLE THEREOF, PRODUCT THEREOF, AND FRICTION MATERIAL CONTAINING THE PRODUCT

CROSS REFERENCE TO RELATED APPLICATIONS

The present application represents the national stage application of International Application PCT/JP2008/056620 filed Mar. 28, 2008, which claims the benefit of Japanese Patent Application 2007-087799 filed Mar. 29, 2007, and Japanese Patent Application 2007-267542 filed Oct. 15, 2007, and Japanese Patent Application 2007-267544 filed Oct. 15, 2007, all of which are hereby incorporated by reference herein in their entirety for all purposes.

TECHNICAL FIELD

The present invention relates to a method of manufacturing an alkali metal titanate, a product of thereof, and a friction material containing the alkali metal titanate. The present invention further relates to a method of manufacturing a hollow body particle of the alkali metal titanate, a product thereof, and a friction material containing the hollow body particle.

RELATED ART

An alkali metal titanate is a useful material for a friction material of a frictional slide member utilized in brake lining, a disc pad, and a clutch fading arranged in a motor vehicle, a train, an aircraft and an industrial machinery. A conventional friction material is formed with asbestos dispersed in an organic or an inorganic binding agent. However, the asbestos has an insufficient friction characteristics such as heat resistance or abrasion resistance, and has an environmental problem such as asoncogenic property. There has been requested a substitutional material for recent years.

The friction material utilizing the alkali metal titanate such as a fibrous potassium titanate is proposed for use of a base fiber or a friction modifier. The potassium titanate fiber is free from carcinogenicity and improves several characteristics such as heat resistance, less fading, thermal stability. The potassium titanate is presented by a formula of $K_2O \cdot nTiO_2$ (n: integer of 1-12). Among them, potassium hexatitanate (n=6) fiber or potassium octatitanate (n=8) has a tunnel structure crystal and is suitable for the friction material having an eminent heat resistance.

The conventional potassium titanate fibers have an average diameter of 0.1-0.5 μm and an average length of 10-20 μm. However, these fibers are not within the range recommended by World Health Organization (WHO). The WHO excludes an inhalant fiber shaped compound, which has the average minor axis of at most 3 μm, the average fiber length of at least 5 μm, and the aspect ratio of at least 3.

The conventional method of manufacturing of the alkali metal titanate fiber or a whisker thereof is complicated. The conventional method of manufacturing the potassium titanate includes the steps of mixing a titanium compound such as titanium oxide and a potassium compound such as potassium carbonate, sintering the mixture, immersing the sintered body into water to defibrate, neutralizing the defibrated material with an acid, adjusting the potassium component, and drying the adjusted material. The tunnel structure of potassium hexatitanate or potassium octatitanate having the good heat resistance has a difficulty to grow the crystal with the whisker shape or the fiber shape. Potassium dititanate fibers or potassium tetratitanate fibers having a layered crystal structure are first synthesized and adjusted about pH. The adjusted fibers are again sintered to form the tunnel structure crystal. The resultant fibers are then defibrated and classified. For this reason, the conventional method increases manufacturing cost and also the price. The commercial potassium titanate fibers have a small bulk specific gravity, a less flowability, so that a shortage of supply during manufacturing occurs, and the material sticks on a supply passage and causes clogging. When the friction material is manufactured, it is difficult to uniformly mix the commercial fibers with the raw material, resulting in an inhomogeneous friction material and a poor quality control.

JP 2000-265157 discloses a friction material containing a friction modifier having a layer and a plate shaped potassium titanate in place of the fiber shape. The friction modifier has the major axis of 10-500 μm and the minor axis (thickness) of 50-1000 nm. This material is not fiber-shaped and is thus not aware of clogging the supply passage of the manufacturing process. This shape improves the work environment about inhalation. Even this material, the manufacturing process is still complicated, resulting in increase of manufacturing cost and less economical. JP H01-294553 discloses a friction material containing a base material fiber of a potassium titanate having a columnar or a plate shape, a cross sectional diameter of at least 5 μm, and a length of at least 50 μm. However, this fiber does not solve the above-mentioned problems.

JP 2003-335519 discloses a method of manufacturing of an alkali metal titanate with a low cost. The method utilizes a cheap ilmenite as a titanium source to reduce the manufacturing cost, although the ilmenite contains a relatively amount of impurities. This method utilizes a vibration mill for grinding and the ground material is sintered at a predetermined temperature to synthesize the potassium lithium titanate. Since the ilmenite contains the relatively large amount impurity irons, it is necessary to introduce a step to remove the impurity. This method has a difficulty to control a composition of the alkali metal titanate. When the alkali metal hexatitanate is manufactured, the alkali metal dititanate or the alkali metal hexatitanate is first manufactured, then rinsed or acid-washed, and sintered at a predetermined temperature, resulting in the complicated process.

Patent Document 1 JP 2000-265157
Patent Document 2 JP H01-294553
Patent Document 3 JP 2003-335519

DISCLOSURE OF THE INVENTION

An object of the present invention is to provide a method of manufacturing an alkali metal titanate at low cost, the alkali metal titanate manufactured by the method, and a friction material containing the same. The alkali metal titanate of the present invention has a good heat resistance and a rod, a columnar, or other shape with less fiber shape, which is suitable for a base fiber of the friction material and a friction modifier. The method provides a uniform mixture of a titanium oxide and an alkali material of a raw material to ensure a good reactivity. Accordingly, the resultant alkali metal titanate has a high crystallinity and a high purity with a desired composition.

Another object of the present invention is to provide a method of manufacturing a hollow body particle of the alkali metal titanate, the hollow body particle manufactured by the method, and a friction material containing the hollow body particle.

According to one aspect of the present invention, the alkali metal titanate is easily manufactured with a new method compared to the conventional method. The alkali metal titanate compound manufactured has mainly a rod, a columnar, a cylindrical, a rectangular, or a plate shape. The compound has a good crystallinity, and a high purity composition.

According to another aspect of the present invention, the alkali metal titanate hollow boy particles each having a shell structure is easily manufactured. The hollow body particles each are covered with the alkali metal titanate particles bound together. The alkali metal titanate or the hollow body particle thereof has a superior heat resistance when adapted for the friction modifier.

According to a first aspect of the present invention, a method of manufacturing an alkali metal titanate, includes the steps of: mixing an aggregate or a granulation of a titanium compound and an alkali metal compound, the aggregate or the granulation of the titanium compound having an average particle diameter of 0.1-10 mm; and sintering the mixture for manufacturing the alkali metal titanate.

Preferably, a vibration rod mill allows a uniform mixing and pulverization. The vibration rod mill prevents sticking of the aggregate or the granulation to an interior of the mill when they are mixed.

Preferably, the mixing is performed with an addition agent to prevent sticking or coalescence of the mixture.

Preferably, the addition agent is alcohol.

Preferably, the mixing is performed with an addition of titanium metal powder or titanium hydride powder.

Preferably, the titanium compound is an aggregate or a granulation of titanium oxide.

Preferably, the alkali metal compound is a carbonate or a hydroxide of the alkali metal.

Preferably, the alkali metal titanate easily manufacture at low cost is potassium tetratitanate and/or potassium hexatitanate.

Preferably, the alkali metal compound is a compound selected from at least one of potassium, sodium and lithium.

Preferably, the sintering is performed at a temperature between 800° C.-1300° C. to manufacture the desired composition of the potassium titanate. The high sintering temperature permits manufacturing of the potassium titanate having a large size of an average minor axis and an average length (average major axis).

Preferably, the heating-up rate of 0.5° C./min-2° C./min and the sintering temperature of 1000° C.-1300° C. provides the potassium titanate having the average minor axis of 3-10 µm and the average aspect ratio (major axis/minor axis) of 1.5-10.

Preferably, the heating-up rate of 2° C./min-5° C./min and the sintering temperature of 1000-1300° C. provides the potassium titanate having the average minor axis of 1 µm-3 µm and the average major axis of 3 µm-5 µm.

Preferably, the alkali metal titanate manufactured described above is adapted for a friction modifier of the friction material.

According to a second aspect of the present invention, a method of manufacturing a hollow body particle of an alkali metal titanate includes the steps of: manufacturing the alkali metal titanate with the method described above; dispersing the obtained alkali metal titanate in a solvent to form a slurry; and spray drying the slurry.

Preferably, the spray dried particled are further heat treated at a temperature of 750° C.-1300° C.

Preferably, the hollow body particles of the alkali metal titanate each have a shell structure, the shell structure being formed with the alkali metal titanate particles having a rod, a columnar, a cylindrical, a rectangular and/or a plate shape, an average minor axis of 3 µm-10 µm, and an average aspect ratio (major axis/minor axis) of 1.5-10.

Preferably, the hollow body particles or the shell structure particles of the alkali metal titanate have the average minor axis of 1 µm-3 µm and the average major axis of 3 µm-5 µm.

Preferably, the hollow body particles are adapted for a friction modifier of a friction material.

Preferably, the method further includes the steps of: dispersing the alkali metal titanate described above and inorganic oxide particles with Mohs hardness (hereafter referred to M.h) of 6-9 into a solvent to form a slurry; and spray drying the slurry to form the hollow body particles of the alkali metal titanate.

Preferably, the spray dried particles are further heat treated at a temperature of 750° C.-1300° C.

Preferably, the inorganic oxide particles (M.h: 6-9) are contained 1-3 wt % with respect to the alkali metal titanate.

Preferably, the hollow body particles having the shell structures are each formed with the alkali metal titanate particles and the inorganic oxides particles. The alkali metal titanate particles have the rod, the columnar, the cylindrical, the rectangular, and/or the plate shape, the average minor axis of 3 µm-10 µm, and the average aspect ratio (major axis/minor axis) of 1.5-10. The inorganic oxide particles have Mohs hardness of 6-9.

Preferably, the hollow body particles of the alkali metal titanate having the shell structures each is formed with the alkali metal titanate particles having the average minor axis of 1 µm-3 µm and the major axis of 3 µm-5 µm, and the inorganic oxide particles having Mohs hardness of 6-9.

Preferably, the hollow body particles are adapted for a friction modifier of the friction material.

The present invention manufactures easily and at low cost the alkali metal titanate particles and the hollow boy particles having the shell structures formed with the alkali metal titanate particles. The manufactured alkali metal titanate particles contain less fiber shape and have the plate or the columnar shape of the relatively large minor axis (preferably at least 3 µm). The method of the present invention includes the steps of pulverizing the aggregate or the granulation of the titanium compound and the alkali metal compound such as potassium compound with a vibration mill, especially a vibration rod mill, and sintering the mixture. The present method does not require a step of adjusting a component after sintering. The alkali metal titanate, especially potassium tetratitanate and/or potassium hexatitanate, having a desired composition is thus manufactured. The friction material containing the alkali metal titanate, especially the hollow body particles thereof, has the stable friction coefficient and the abrasion resistance as the friction material in the range from low to high temperature. The present invention is adapted for brake member material for motor vehicle, railroad vehicle, aircraft and industrial machine. The brake member material is, for example, a clutch fading material and a brake material such as the brake lining or a disk pad to improve the brake performance, brake stability and life time thereof.

BEST MODE FOR CARRYING OUT THE INVENTION

A method of manufacturing an alkali metal titanate of the present invention is described in detail.

A titanium compound utilized in the method of the present invention is, for example, titanium dioxide, titanium suboxide, orthotitanic acid or salt thereof, metatitanic acid or salt thereof, titanium hydroxide, peroxotitanic acid and salt thereof, or a combination thereof with two or more species. Among them, titanium dioxide is most suitable. It is the reason that titanium dioxide has a good mixability and reactivity with the alkali metal compound and is cheap. Preferably, the crystal structure is rutile or anatase. A rutile type titanium dioxide provides a large size crystal of the alkali metal titanate.

The present invention utilizes an aggregate or granulation of the titanium compound as a raw material. The aggregate (including granulated powder) or the granulation of the titanium dioxide is preferable. Preferably, the average particle diameter is at least 0.1 mm, preferably 0.5-10 mm, more preferably 0.5-1 mm. The small average particle diameter makes the uniform mixing with the alkali metal compound difficult. When the large mill such as the vibration mill is utilized for mixing, the mixture sticks the mill during mixing. The large average particle diameter makes the mixing difficult and reduces the efficiency. The aggregate or the granulation larger than 10 mm is pulverized or ground to the size at most 10 mm to be adapted for the aggregate or the granulation of the titanium compound of the present invention.

Figure 1:
FIG. 1 is a SEM micrograph of aggregates of titanium oxide of the present invention.
Figure 2:
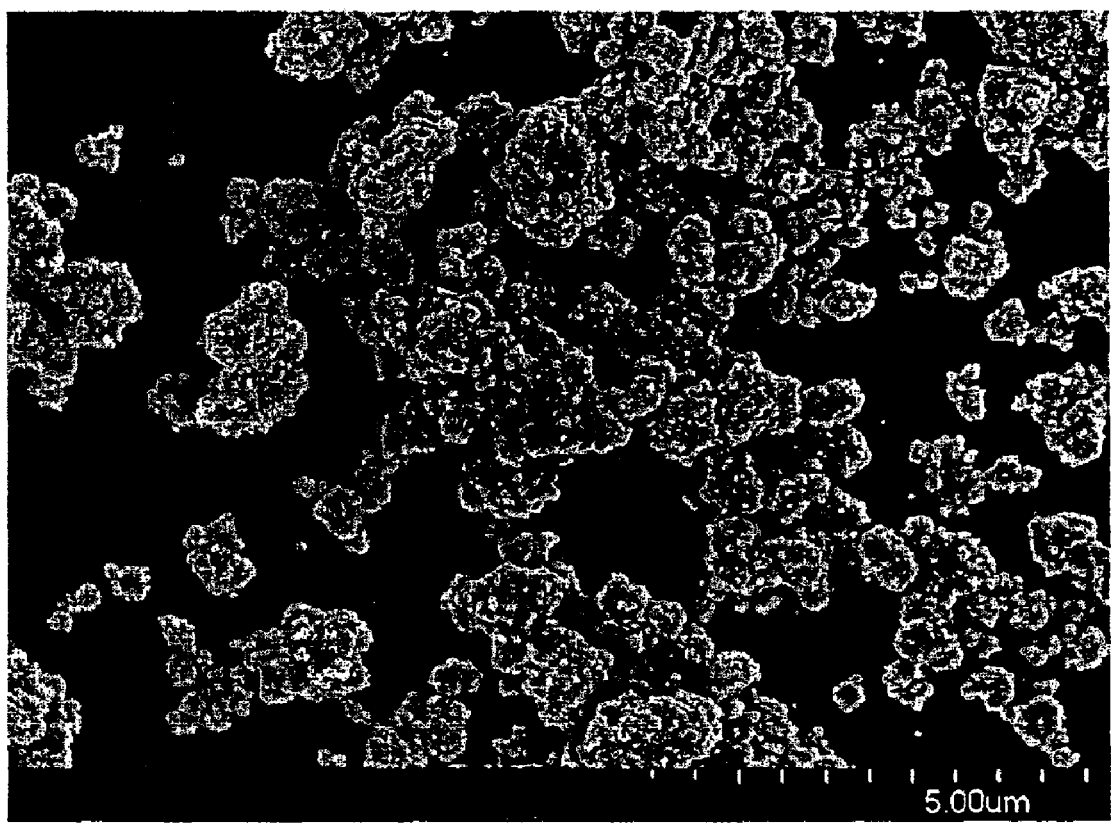
FIG. 2 is a SEM micrograph of a commercial pigment titanium oxide.

The aggregate of the present invention indicates a coarse particle (including a granulation) and has the average particle diameter of 0.1 mm-10 mm. The aggregate is, for example, a secondary particle aggregated with primary particles, a tertiary particle aggregated with the secondary particles, and/or a $(n+1)^{th}$ particle aggregated with $n^{th}$ particles. The aggregates each have usually the average particle diameter of 0.1 mm-10 mm. The titanium dioxide powder or the aggregates thereof each have the average particle diameter of about a few microns (at most about 20 µm). Since it is difficult to disperse the primary particle thereof, the secondary particles are excluded. The present invention may include a trace amount of these titanium dioxide particles unless the uniform mixing is impeded. FIG. 1 shows a SEM micrograph of the aggregates of the titanium oxide utilized in the present invention, and FIG. 2 shows a SEM micrograph of conventional, commercial titanium oxide particles for pigment.

The average particle diameter of the aggregates or the granulations of the titanium compound of the present invention is measured with a screening test of chemical products in accord with JISK0069. Unless otherwise specified, the measurement is made with JISK0069.

The aggregates of the titanium dioxide are manufactured with titanium sulfate or titanyl sulfate (titanium oxide with sulfuric acid method), with oxidation or hydrolysis of titanium tetrachloride in gas phase (titanium oxide with gas-phase process), or with neutralization or hydrolysis of titanium tetrachloride aqueous solution or alkoxy titanium. The coarse particles of the pigment titanium oxide are removed prior to final process of the product by pulverizing, grinding or classifying the aggregates to adjust the particle size. Preferably, the present invention utilizes an intermediate product, that is, clinker, as a raw material. The clinker is the preferable aggregate of the titanium compound as the raw material so that the aggregates can be uniformly mixed with the alkali metal compound when they are pulverized together and the sticking of the mixture is prevented. Accordingly, the desired alkali metal titanate is manufactured without adjusting the component of the raw material.

The granulations may be replaced with the aggregates for the titanium compound. The granulations are prepared with a spray dry of the commercial fine powder titanium oxide or kneading with addition of a binder. The use of the granulations of the titanium compound prevents sticking of the material to the inner wall of the large size mechanical mixing apparatus such as the vibration mill. The granulations of the titanium compound thus permit the uniform mixing with the alkali metal compound similar to the aggregates of the titanium compound.

The mixing ratio when manufacturing the alkali metal titanate of the present invention is 0.5-10 mol, preferably 1-8 mol of Ti atoms in the aggregates or the granulations of the titanium compound, and 1-3 mol, preferably 1.5-2.5 mol, of the alkali metal atoms in the alkali metal compound, with respect to 1 mol of the alkali metal titanate ($M_2O \cdot nTiO_2$, M: alkali metal) sintered from the alkali metal compound. When the potassium tetratitanate is manufactured, the mixing ratio is 3.5-4.5 mol, preferably 3.8-4.2 mol, and most preferably 4.0 mol of Ti atoms in the aggregates or the granulations of the titanium dioxide, and 1.8-2.2 mol, preferably 1.9-2.1 mol of K atoms of the potassium compound, with respect to 1 mol of the potassium tetratitanate ($K_2O \cdot 4TiO_2$) after sintering. When the potassium hexatitanate is manufactured, the mixing ratio is 5.5-5.6 mol, preferably 5.8-6.2 mol, and most preferably 6.0 mol of Ti atoms in the aggregates or the granulations of the titanium dioxide, and 1.8-2.2 mol, preferably 1.9-2.1 mol, and most preferably 2 mol in K atoms in the potassium compound, with respect to 1 mol of the potassium haxatitanate ($K_2O \cdot 6TiO_2$) after sintering. When titanium metal powder or titanium hydride powder is added to the mixture of the aggregates or the granulations of the titanium compound and the alkali metal compound, it is necessary to adjust the mixing ratio in order that Ti of the titanium metal powder or the titanium hydride powder is included in Ti of the titanium compound. The titanium metal powder or the titanium hydride powder is oxidized into the titanium dioxide.

The present invention can control the composition of the alkali metal titanate of the final product with adjustment of the mixing ratio of the raw materials. When the titanium compound and the alkali metal compound are reacted together in the conventional method, the late reaction rate causes a loss of the alkali metal compound so that the alkali metal compound was added more than the theoretical value. The present invention provides the method of manufacturing the alkali metal titanate having almost the same composition as theoretically expected from the mixture of the raw materials of the titanium compound and the alkali metal compound after sintering.

The mixing method of the present invention can adopt a dry mixing method or a wet mixing method. The dry mixing method is preferable from the viewpoint of simple process. The conventional V-type blender or the ball mill, however, can not well uniformly mix the aggregates or the granulations of the titanium compound and the alkali metal compound. It is preferable to utilize the mechanical pulveriziton apparatus such as the vibration mill, the vibration rod mill, a vibration ball mill, a beads mill, a turbo mill, a planetary ball mill. The vibration rod mill having a rod is the most suitable apparatus for pulverizing the raw material. The vibration rod mill mixes and pulverizes the mixture of the aggregates or the granulations of the titanium compound and the alkali metal compound. The vibration rod mill pulverizes the large size particles between the rods but does not excessively pulverize the fine powder such as the ball mill. The titanium oxide has a strong stick character due to hydroxyl group present on the surface thereof, and a large specific surface with decrease of the particle diameter. The excessive pulverization of the titanium oxide causes sticking to the interior of the vibration mill. However, the present invention prevents the sticking of the particles and allows the uniform pulverization and mixing compared to other mixing method. When the aggregates or the granulations of the titanium dioxide is used as the raw material of the titanium compound, and are pulverized with the vibration rod mill, the coarse particles of the titanium dioxide are pulverized and the excessive pulverization of the fine primary particles are avoided to some extent. The sticking of the titanium dioxide to the interior of the mill is thus prevented, resulting in the uniform mixing. When the titanium dioxide such as the pigment is utilized as the raw material, the fine primary particles are excessively pulverized and tend to stick to the interior of the mill, resulting in a difficulty to achieve the uniform mixing. When the titanium mineral such as the ilmenite is utilized as the raw material, the composition control of the alkali metal titanate becomes difficult. It is preferable to use a pure titanium dioxide.

"Uniform mixing" described in the specification indicates that the aggregates or the granulations of the titanium compound is mixed with the alkali metal compound and the resultant mixture is uniform compared to other mixture, for example, the mixture of the pigment titanium dioxide and the alkali metal compound. "Uniform mixing" described in the specification indicates that the vibration mill, especially the vibration rod mill of the present invention achieves the uniform dispersion of the raw material compared to the mixing of the conventional V-type blender or the ball mill.

It is preferable to add alcohol when the titanium compound and the alkali metal compound are pulverized and mixed with the vibration mill, especially the vibration rod mill. The amount of addition of the alcohol is 0.1-3.0 wt %, preferably 0.3-1.0 wt % with respect to the total weight of the pulverized material, which includes the titanium compound, the alkali metal compound, and the addition agent such as an aggregation inhibitor. It is preferable to keep inside of the mill during pulverization and mixing at a temperature higher than a boiling point of the alcohol to pulverize the material with vaporization of the alcohol. The addition of the alcohol prevents adhesion or sticking of the titanium compound to the interior of the mill and assures the mixture uniformly dispersed with the aggregates of the titanium compound and the alkali metal compound. The alcohol is selected from methanol, ethanol, amyl alcohol, allyl alcohol, propargyl alcohol, ethylene glycol, propylene glycol, erythrol, 2-butene-1,4-diol, glycerin, pentaerythritol, arabitol, sorbit, pentitol, polyethylene glycol, polypropylene glycol, and polyglycerol. It is preferable to use methanol and ethanol having the relatively low boiling point.

It is preferable to add the addition agent such as the aggregation inhibitor or a lubricant agent to restrain the aggregation or the sticking of the titanium compound inside of the container of the vibration mill. It is preferable that the addition agent decomposes, burns, or vaporizes during the sintering of the mixture of the titanium compound and the alkali metal compound, and is not remained in the resultant alkali metal titanate. The addition agent is cellulose, fatty acids, alcohol, grains, urea, and polymer. For example, they are methylcellulose, lignin, wood flour, pulp powder, natural fiber powder, stearic acid, ammonium stearate, sorbitandistearrate, xylose, glucose, galactose, sucrose, starch, sugar such as dextrin, wheat flour, soy flour, rice flour, sugar, urea, biurea, semicarbazide, guanidine carbonate, aminoguanidine, azodicarbonamide, acrylic resin powder, polypropylene powder, polyethylene powder, and polystyrene powder. The solid and powder wood flour, the pulp flour, and the natural fiber powder are preferable:

When the wet mixing method is utilized for mixing, a conventional organic solvent such as pure water, alcohol, acetone, MEK, or THF is used. It is preferable to add a surface active agent or a dispersing agent to improve the dispersion of the mixed powder and the uniform mixing thereof.

The titanium metal powder or titanium hydride powder may be added to the mixture of the aggregates or the granulations of the titanium compound and the alkali metal compound. It is preferable to add 0.01-0.2 mol, preferably 0.03-0.1 mol of Ti atoms with respect to 1 mol of Ti atoms of the titanium compound. The addition of the titanium metal powder or the titanium hydride reduces the temperature distribution inside of the reactor vessel with simultaneous burning thereof during sintering. The uniform reaction and the desired composition of the alkali metal titanate is attained.

The alkali metal compound of the present invention is selected at least one of metals of potassium compound, sodium compound and lithium compound. The potassium compound, which is the raw material of the alkali metal titanate adapted for the friction modifier, is preferable. The lithium compound, which is the raw material of lithium titanate used for an electrode material of lithium ion secondary battery, is also preferable. The alkali metal compound adopts carbonate thereof, hydroxide thereof, oxalate thereof. The carbonate and the hydroxide are preferable since they melt during sintering reaction. They melt, decompose and easily react during sintering of the titanium compound. They generate only carbon dioxide and water after decomposition and are not remained as the impurities in the product. When the potassium titanate is manufactured, the potassium compound such as potassium oxide, potassium carbonate, potassium hydroxide, and potassium oxalate are utilized, and preferably potassium carbonate. The potassium compounds can be utilized a single or at least two kinds. When the sodium titanate is manufactured, the sodium compound such as sodium carbonate, sodium hydroxide, and sodium oxalate are utilized, preferably sodium carbonate. When the lithium titanate is manufactured, lithium carbonate and lithium hydroxide are utilized preferably lithium carbonate. When the potassium titanate is manufactured, the titanium compound such as titanium oxide, and the potassium compound such as potassium carbonate are mixed and sintered. The addition of the lithium compound such as the lithium carbonate to the potassium compound is preferable to control the shape of the potassium titanate. The addition of an alkali earth metal such as magnesium compound or barium compound is preferable to inhibit formation of the fibrous crystal. Other compound such as an inorganic oxide can be added by the amount not to affect formation of the alkali metal titanate. The inorganic oxide is, for example, $CeO_2$, $WO_3$, $ZrO_2$, $Zr(CO_3)_2$, and $CaCO_3$.

The aggregates or the granulations of the titanium compound and the alkali metal compound obtained with the method described above are uniformly mixed and sintered to achieve the reaction between them. The resulting alkali metal titanate has a rod, a columnar, a cylindrical, a rectangular, a granular and/or a plate shape. The mixture is sintered in a reaction vessel or the molding containing the binder in the mixture may be directly sintered. It is preferable to fully charge the mixture in the reaction vessel if one considers the reactivity and the resultant shape of the alkali metal titanate. It is preferable to use the reaction vessel of a ceramic material such as alumina for sintering and it is preferable that the vessel has a shape to prevent to entry of air in the mixture when the mixture is charged in the vessel. The vessel may have a cylindrical shape, a columnar shape with a recess, square shape with a recess, and a plate shape. The columnar shape or the square shape having the recess with a suitable depth is suitable to prevent entry of oxygen of the air during sintering.

When the mixture is charged in the ceramic reaction vessel, it is preferable to interpose a carbonizing sheet member between a bottom of the vessel and the charged mixture. The sheet member prevents loss of the melted alkali metal compound of the mixture during sintering and also prevents penetration of the molten alkali metal compound into the ceramic reaction vessel. The sheet member may be disposed between the mixture and an inner wall of the recess of the vessel to prevent loss of the potassium compound and assuredly prevent penetration of the molten potassium compound into the ceramic reaction vessel. It is preferable to cover the whole inner wall of the recess of the ceramic vessel with the sheet member to substantially prevent loss of the alkali metal compound or penetration thereof to the ceramic reaction vessel.

It is preferable that the carbonizing sheet member is carbonized when the mixture is sintered, and finally burns out. It is preferable that the sheet member does not form any soft material or fluid material during the sintering. The carbonizing sheet member is, for example, paper, natural fiber, cortex, or thermosetting resin. It is not recommended to use the paper coated with vinyl chloride, which is easily softened but hardly carbonized. The suitable paper is, for example, non-bleach kraft paper, double-sided bleach kraft paper, one-side luster bleach wrap paper, fiberboard, newspaper, fine paper, medium quality paper, recycled paper, book paper, cast coated paper, coated paper, and PPC for printing. The natural fiber is, for example, cotton, hemp, silk, etc. The thermosetting resin is, for example, phenol resin, epoxy resin, melamine resin, etc. The shape of the sheet member is sheet, woven fabric, nonwoven fabric or bag.

The temperature of the sintering depends on the kinds of the alkali metal titanate or the crystal form. The temperature is generally 800-1300° C., preferably 1000-1300° C. for the potassium titanate. The shape of the potassium titanate is controllable with the sintering temperature. The higher temperature thereof forms the large size of the potassium titanate. The temperature lower than 800° C. is not enough for reaction. It is preferable to keep the sintering temperature at most 1300° C. since the temperature higher than 1300° C. requires a high cost furnace and is close to the melting point of the potassium titanate, resulting in difficulty of control of the shape thereof. Lithium titanate of spinel type crystal structure ($Li_4Ti_5O_{12}$) is sintered at 800-1000° C., preferably 850-950° C. The crystal structure of $Li_2TiO_3$ is sintered at 950-1450° C., preferably 950-1200° C. The sodium hexatitanate is sintered at 400-900° C., preferably 500-800° C. The sintering time period is 1-10 hours at the temperatures described above, preferably 2-5 hours. The sintered body is cooled down to RT after sintering but the heating-up rate from RT to the sintering temperature is 0.5-10° C./min, preferably 0.5-5° C./min. The cooling-down rate from the sintering temperature to 300° C. is 0.5-10° C./min, preferably 1-5° C./min. The control of the sintering temperature, the heating-up rate, and the cooling-down rate provide the alkali metal titanate of the present invention. The method of manufacturing the potassium titanate of the present invention employs the above described sintering temperatures, the relatively slow heating-up rate, and the relatively slow cooling-down rate so that the potassium titanate grows faster and forms the crystal having the rod, the columnar, or the plate shape having the large size minor axis. The average minor axis is adjusted with the sintering temperature and the heating-up rate. For example, the sintering temperature of 1000-1300° C. and the heating-up rate of 0.5-2° C./min achieve the potassium titanate having the average minor axis of 3 μm-10 μm. As higher the sintering temperature and slower the heating-up rate, the average minor axis of the potassium titanate grows in size. When the heating-up rate is changed at least 2° C./min, especially from 2° C./rain to 5° C./rain, the potassium titanate has the average minor axis of 1 μm-3 μm.

The resultant alkali metal titanate is then mechanically pulverized or ground as desired. When the sintered potassium titanate includes the fibrous particles having the minor axis of at most 3 μm and the major axis of at least 5 μm, it is preferable to pulverize the particles having the major axis of at least 5 μm down to the size of less than 5 μm. The mechanical pulverization or grinding is adopted the prior art such as the vibration mill, the vibration ball mill, the beads mill, the turbo mill, and the planetary ball mill. The pulverized or ground alkali metal titanate is classified or sorted. It is preferable to remove the fibrous potassium titanate with the minor axis of at most 3 μm or a powder with classification or sorting.

The method of manufacturing the alkali metal titanate of the present invention includes the steps of uniformly mixing the aggregates or the granulations of the titanium compound and the alkali metal compound with grinding, and sintering the mixture so that the desired composition of the alkali metal titanate compound having a high quality crystallinity and a high purity is obtained. The conventional method performs the pH adjustment or the acid cleaning after sintering to adjust the component. The present invention manufactures potassium tetratitanate, potassium hexatitanate or the mixture thereof without these steps. The potassium titanate of the present invention includes the particles having the rod, the columnar, the cylindrical, the rectangular, the granular and/or the plate shape. The particles have the average minor axis (or average thickness) of 3.0-10 μm, and the average aspect ratio (major axis/minor axis) of 1.5-10. The average minor axis is determined with the image analysis of a scanning electron microscopy (SEM) micrograph of about 200 particles. The following average minor axis, the average length (average major axis) are also measured with the same way. The average aspect ratio is calculated with the ratio of the major axis to the minor axis measured with the SEM micrograph. It is preferable to mechanically pulverize or grind the potassium titanate to the aspect ratio of less than 3, preferably less than 2.5. The adjustment of the heating-up rate besides the sintering temperature can also provide the potassium titanate of the average minor axis of 1-3 μm. When the particles have the minor axis of at most 3 μm, it is necessary to pulverize or grind the particles to have the major axis of 3 μm-5 μm conforming to the range of WHO.

The potassium titanate manufactured with the present invention has a formula of $K_2O.nTiO_2$ (n: integer of 1-12). Preferably, n is 2, 4, 6, and 8. Most preferably, n is 4 (potassium tetratitanate), 6 (potassium hexatitanate), or the mixture thereof. These materials have eminent heat resistance when used as the friction modifier and contain less fibrous shape.

The potassium titanate among the alkali metal titanate has the specified shapes such as the rod, the columnar, the cylindrical, the rectangular, the plate shape, but can be mixed with the particles having the powder shape. The addition of the potassium titanate having the powder shape to the mixture improves the flowability and the uniform dispersion in the friction material, resulting in improvement of the heat resistance of the friction material.

The potassium titanate with the fiber, the rod or the columnar shape among the alkali metal titanate may be aggregated or granulated. The aggregates of the alkali metal titanate are easily handled and prevent flying or inhalation in the working environment. The average diameter is 20-200 μm, preferably 50-100 μm. The aggregate of the alkali metal titanate with this average diameter desegregates into the rod or the columnar shape when mixed with other component of the friction material. The average diameter of the particles is determined with the image analysis of SEM micrograph about 200 particles. The aggregates of the alkali metal titanate are formed with the sintering. The resulting aggregates may be mechanically pulverized or ground, and, if desired, screened or classified. The solvent may be added to the sintered alkali metal titanate after pulverization or grinding in order to prepare the aggregates, granulations, or blocks of the particles. The sintered alkali metal titanate may be dispersed in the solvent to form a slurry, and the formed slurry is spray-dried to form hollow body particles of the alkali metal titanate.

The following explains a detail of the method of manufacturing the hollow body particles of the alkali metal titanate.

The alkali metal titanate described above having mainly the rod, the columnar, the cylindrical, the rectangular, the granular, and/or the plate shape is dispersed in the solvent together with the binder and stirred to form the slurry of the alkali metal titanate particles.

The binder is the organic polymer, for example, gelatin, dextrin, starch, gum arabic, cellulose polymers, polyvinyl alcohol (PVA), carboxymethylcellulose (CMC), polyvinylpyrrolidone (PVP), hexapropylcellulose (HPC), phenolic resin, and epoxy resin. The solvent is the organic solvent or water. Water is preferable since it is easily handled. An addition agent such as the surface active agent may be added if necessary. It is preferable to keep 10-75 wt % of the total concentration of the slurry alkali metal titanate and the binder. When the total concentration is less than 10 wt %, the product efficiency of the hollow body particles of the alkali metal titanate decreases. When the total concentration is more than 75 wt %, the slurry has a high viscosity and it is difficult to form the hollow body particles of the alkali metal titanate having the diameter of at most 200 μm, resulting in a wide range of the particle size distribution.

The prepared slurry of the alkali metal titanate is spray-dried with a spray dryer. When the slurry is spray-dried with the disk rotary type with a high-speed rotation, the slurry supplied on the rotation disk becomes liquid droplets due to centrifugal force and the droplets are then dried at the temperature of 200° C.-800° C. When the droplets are dried, a vaporization of the water in each droplet occurs and outwardly pushes the particles in the droplet, resulting in the formation of the spherical shape hollow body particles of the alkali metal titanate. The above range of the drying temperature provides the alkali metal titanate hollow body particles. The spray dryer is a pressure nozzle, a two-fluid nozzle method, an ultrasonic nozzle type and the like besides the disk rotary type. The pressure nozzle type sprays the slurry from the nozzle with high pressure. The two-fluid nozzle type sprays the slurry together with a compressed air or steam. The diameter (outer diameter) of the hollow body particles of the spray dried alkali metal titanate is adjusted with the speed of rotation of the disk and the diameter of the nozzle. As higher the speed of the rotation and smaller the size of the nozzle diameter, the diameter of the resulting particles decreases. It is preferable to adjust the average diameter (outer diameter) of the hollow body particles of the alkali metal titanate in the range of 20-200 μm, preferably 50-150 μm. The particle diameter (outer diameter) of this range allows an improvement of handling and is suitable to the friction modifier.

Figure 7:
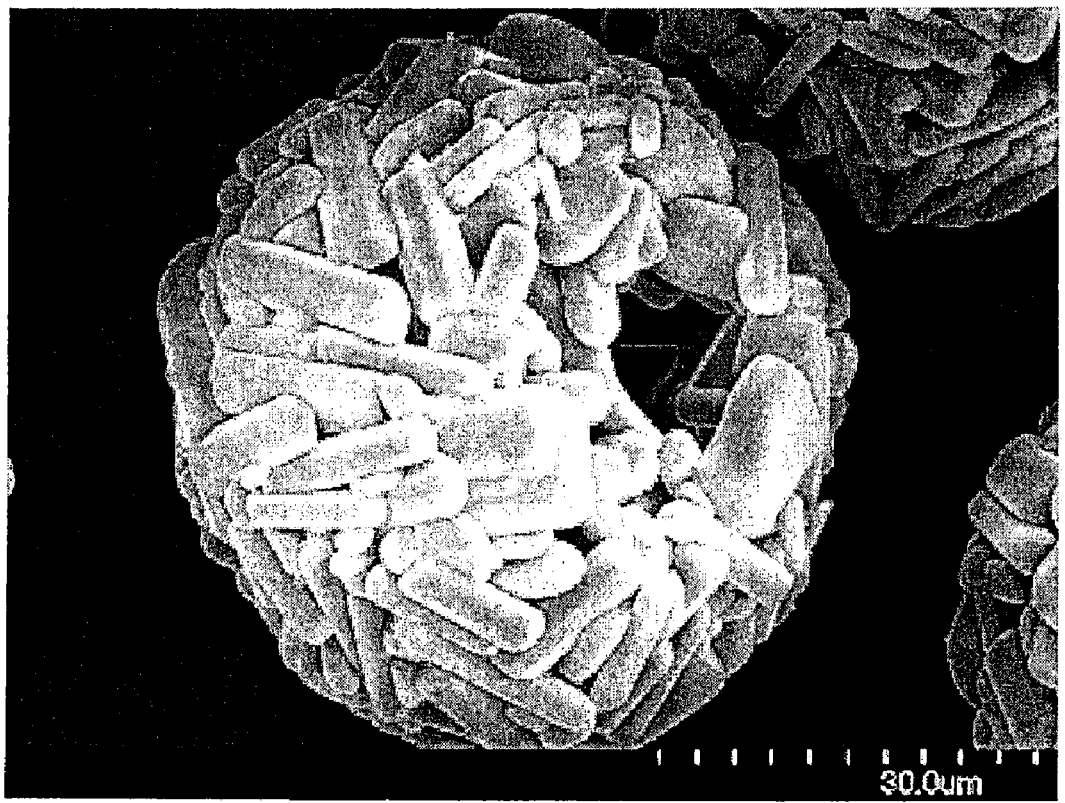
FIG. 7 is a SEM micrograph of a hollow body particle of the alkali metal titanate of the present invention.

The spray dried hollow body particles of the alkali metal titanate are then heat treated. When the alkali metal titanate is the potassium titanate, it is preferable to heat treat at the temperature of 750° C.-1300° C. The hollow body particles of the sodium titanate are heat treated at 400° C.-900° C. The hollow body particles of the lithium titanate are heat treated at 800° C.-1200° C. The heat treatment at the suitable temperatures binds the adjacent particles of the alkali metal titanate one another with sintering or fusion at the contact portions. FIG. 7 is a SEM micrograph of the hollow body particle of the potassium titanate manufactured with the present invention. As appreciated in the figure, the hollow body particle is covered with the potassium titanate particles. The potassium titanate particles have the rod, the columnar, the cylindrical, the rectangular, the granular and/or the plate shape, and the adjacent particles are bound together with sintering or fusion and form the cavity in the hollow body particle.

Preferably, the hollow body particles of the potassium titanate of the present invention have the fracture strength of at least 2.0 kg/cm$^2$ with sintering or fusion. The hollow body particles allow a good flowable mixture with other materials without separation (dispersion) of the particles forming the hollow body particle. When the hollow body particles of the alkali metal titanate is mixed with other component as the friction material, for example, to mold the brake pad, the mixture is uniformly dispersed (mixed) without separation (dispersion) of the alkali metal titanate particles forming the hollow body particles. Accordingly, the molding has a high porosity, resulting in a good fade resistance and a less noise.

The hollow body particles of the alkali metal titanate of the present invention indicate that each hollow body particle has the shell structure and is covered with the alkali metal titanate particles. The shape is similar to a balloon or a ping-pong ball. It is not necessary that the hollow body particles of the alkali metal titanate have a complete shell structure, but they may have partially crack, crevice, cavity and/or loss. Preferably, the average diameter (outer diameter) is 20 μm-200 μm. This size allows easy handling and is adapted for the friction modifier. The average diameter is measured with the image analysis of the SEM micrograph of about 200 hollow body particles.

The method of manufacturing the hollow body particles of the present invention includes forming the slurry by dispersing the resultant alkali metal titanate particles into the solvent, spray drying the slurry, and heat treating the dried mixture. The method easily manufactures the hollow body particles having the shell structure covered with the alkali metal titanate particles having the rod, the columnar, the cylindrical, the rectangular, the granular and/or the plate shape. The hollow body particles of the alkali metal titanate allow uniform flowable dispersion due to the shape when they are blended with other component to form the molding. When the hollow body particles of the potassium titanate are blended with other materials as the friction material, they allow the uniform dispersion and improve the porosity of the molding, resulting in improvement of heat resistance and fade resistance of the friction material.

A second embodiment of the method of manufacturing the hollow body particles of the present invention is described. The method includes the steps of dispersing the alkali metal titanate such as the potassium titanate prepared with the above method having the rod, the columnar, the cylindrical, the rectangular, the granular and/or the plate shape, an inorganic oxide particles having Mohs hardness of 6-9, and a binder together, and stirring the mixture to form a slurry.

The inorganic oxide particles having Mohs hardness (hereafter referred to M.h) of 6-9 is, for example, MgO (M.h: about 6), $SiO_2$ (M.h: about 7), $Cr_2O_3$ (M.h: about 6.5), $Fe_3O_4$ (M.h: about 6), $ZrO_2$ (M.h: about 7.5), $ZrSiO_4$ (zircon, M.h: about 7.5), fused alumina (M.h: about 9), $CeO_2$ (M.h: about 9), $WO_3$ (M.h: about 9). Mohs hardness has the highest number of 10. The inorganic oxide particles with Mohs hardness of less than 6-9 do not provide the mixture effect to the alkali metal titanate crystal, especially the potassium hexatitanate (M.h: about 3-4). The particles of Mohs hardness higher than the range of 6-9 increase a surface damage of an opposite side when used as the friction material. It is apparent that the inorganic oxide particles are not limited to one kind but two kinds are acceptable.

The inorganic oxide particles (M.h: 6-9) is added by 0.5-20 wt %. This amount is also adapted for the mixed inorganic oxide particles. The less amount of the inorganic oxide particles does not give an effect of the addition thereof, but the amount more than 20 wt % reduces the character of the alkali metal titanate crystal and may damage the opposite surface when used as the friction material. It is preferable to add the inorganic oxide particles by 1-3 wt %, especially 1-2 wt % to avoid the surface damage of the opposite side. Preferably, the average particle diameter of the inorganic oxide is 1-10 μm. The fine particles of the diameter of less than 1 μm reduce the friction coefficient of the friction material. Meanwhile, the coarse particles of the diameter of more than 10 μm cause the surface damage of the opposite side.

The same binder described above is also utilized for the mixture of the alkali metal titanate and the inorganic oxide.

The slurry of the alkali metal titanate and the inorganic oxide is spray dried with the spray dryer. When the disk rotary type spray dryer is utilized, the slurry supplied on the disk rotating with the high speed is sprayed with centrifugal force to form the droplets. The formed droplets are dried at the temperature of 200° C.-800° C. When the droplets are dried, the water inside each droplet vaporizes and outwardly pushes the particles in the droplet, resulting in the spherical hollow body particle or the shell structure covered with the alkali metal titanate particles and the inorganic oxide particles. The spray dryer is utilized the same type as described above for manufacturing the hollow body particles.

The diameter (outer diameter) of the hollow body particles manufactured with the spray dry can be adjusted with the number of rotations of the disk or the aperture of the nozzle similar to the method described above. The high speed rotation of the disk and the small size of the aperture of the nozzle form the small diameter of the hollow body particles. Preferably, the average diameter (outer diameter) of the alkali metal titanate hollow body particles is 20-200 μm, more preferably 50-150 μm. The particle diameter (outer diameter) of this range improves handling and is suitable for the friction modifier.

Figure 10:
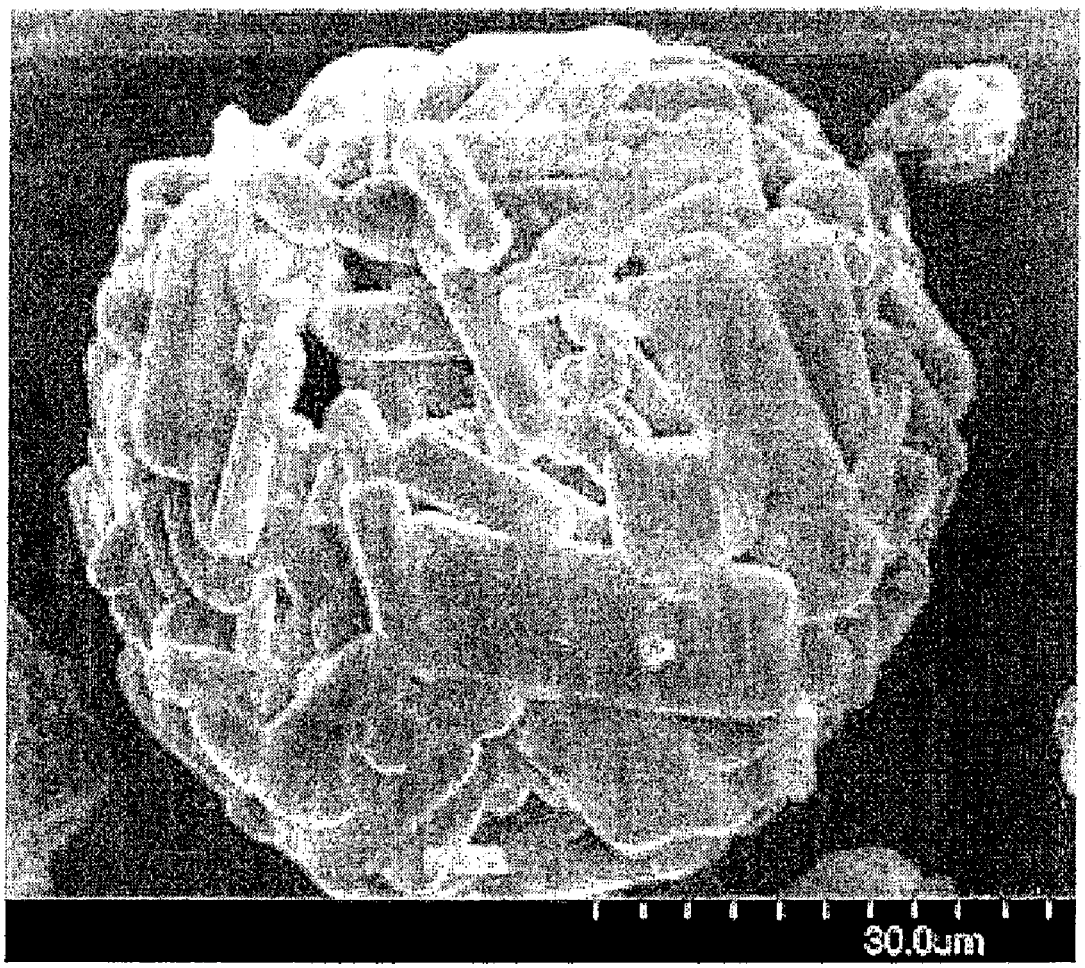
FIG. 10 is a SEM micrograph of a hollow body particle of the alkali metal titanate manufactured with a different method of the present invention.

The spray dried hollow body particles are then heat treated. The potassium titanate particles among the alkali metal titanate are heat treated at 750° C.-1300° C. The sodium titanate is heat treated at the temperature of 450° C.-900° C. and lithium titanate is heat treated at 850° C.-1200° C. These heat treatment temperatures assist binding of the adjacent alkali metal titanate particles together at the contact portions with sintering or fusion. FIG. 10 shows the SEM micrograph of one hollow body particle covered with the alkali metal titanate particles and the inorganic oxide particles (M.h: 6-9). The SEM micrograph shows that the adjacent potassium titanate particles, which have the rod, the columnar, the cylindrical, the rectangular, the granular and/or the plate shape, are bound together with sintering or fusion, and form the spherical shell.

The hollow body particle having the spherical shell structure is formed with the binding of the adjacent alkali metal titanate particles, and the binding between the alkali metal titanate particle and the inorganic oxide particle (M.h: 6-9). The alkali metal titanate particles and the inorganic oxide particles (M.h: 6-9) may be separated one another or may be bound with diffusion or sintering at the contact portions therebetween. Preferably, the hollow body particles have the fracture strength of at least 2.0 $kg/cm^2$. The fracture strength allows good flowability during mixing the associated particles, and prevents separation (dispersion) of the particles forming the associated hollow body particle. This fracture strength prevents the separation (dispersion) of the particles forming the associated hollow body particle when the hollow body particles are blended with other component as the friction material, and allows the uniform dispersion (mixing) in the molding such as the brake pad. Accordingly, the porosity of the molding is thus increased and the friction performance such as fade resistance and less creak is improved.

The hollow body particles of the present invention indicate that the alkali metal titanate particles cover the shell structure such as the balloon or the ping-pong ball. The hollow body particles of the alkali metal titanate may not have the complete shell structure but may have partially crack, crevice, cavity and/or loss. Preferably, the average diameter (outer diameter) thereof is 20 μm-200 μm. This size allows easy handling and is adapted for the friction modifier. The average diameter is determined by the image analysis of SEM micrograph of the about 200 hollow body particles.

The alternative method of manufacturing the hollow body particles includes the steps of dispersing the alkali metal titanate particles prepared with the above described steps and the inorganic oxide particles (M.h: 6-9) in the solvent to form the slurry, spray drying the slurry, and heat treating the dried particles to easily form the hollow body particles. The resultant hollow body particles have the shell structure covered with the alkali metal titanate particles and the inorganic oxide particles. The alkali metal titanate particles have the rod, the columnar, the cylindrical, the rectangular, the granular and/or the plate shape. The hollow body particles allow relatively flowable uniform dispersion when mixed with other component to form the molding, and also improve the porosity of the molding. The hollow body particles containing the alkali metal titanate particles and the inorganic oxide particles provide the good friction material with high heat resistance and fade resistance.

The alkali metal titanate and the hollow body particles thereof, for example the potassium titanate, are adapted for the friction modifier of the friction material. Preferably, the amount of the alkali metal titanate in the friction material is 3.0-50 wt %. The amount of less than 3.0 wt % does not improve the friction wear character and the amount of more than 50 wt % does not improve the friction wear character, resulting in the high cost.

The example of the embodiment of the friction material of the present invention contains the base fiber, the friction modifier, and the binding agent. The friction material contains 1-60 parts by weight of the base fiber, 20-80 parts by weight of the friction modifier such as the potassium titanate among the alkali metal titanate, 10-40 parts by weight of the binding agent, and 0-60 parts by weight of other component.

The base fiber is, for example, resin fiber such as aramid fiber, steel fiber, metal fiber such as brass fiber, carbon fiber, glass fiber, ceramic fiber, rock wool, wood pulp, and potassium titanate fiber. The base fiber can be used together with a finishing agent such as silane coupling agent, titanate coupling agent, or phosphate ester coupling agent.

The friction modifier may utilize other modifier besides the potassium titanate of the present invention unless the addition reduces the effect of the present invention. Other modifier is, for example, is organic powder such as vulcanized or non-vulcanized natural or synthetic rubber powder, cashew resin powder, resin dust, rubber dust, carbon black, graphite powder, molybdenum disulfide, barium sulfate, calcium carbonate, clay, mica, talc, diatomaceous earth, antigorite, sepiolite, montmorillonite, zeolite, metal powder such as copper, aluminum, zinc, iron and oxide powder such as alumina, silica, chromium oxide, titanium oxide, ferric oxide.

The binding agent is, for example, thermosetting resin such as phenolic resin, melanin resin, epoxy resin, acrylic resin, DAP (diallyl phthalate) resins, urea resin, rubber such as natural rubber, nitrile rubber, butadiene rubber, styrene-butadiene rubber, chloroprene rubber, polyisoprene rubber, high-polymer elastomer, or elastomer, polyamide resin, polyphenylene sulfide resin, polyimide resin, and organic binding agent such as thermoplastic resin of thermoplastic liquidcrystal resin, and inorganic binding agent such as alumina sol, silica sol.

The friction material of the present invention may contain a rust inhibitor, a lubricant agent, and a grinding agent besides the above component. The friction material of the present invention can be manufactured with the conventional method.

A first example of the method of manufacturing the friction material of the present invention includes the steps of dispersing the base fiber in the binding agent, blending the friction modifier and other component, if necessary, adjusting the composition of the friction material, charging the resulting composite in the die, and press heating the charged composite to be formed.

A second example includes the steps of dissolving and kneading the binding agent with a double screw extruder, blending the base fiber, the friction modifier, and other component when necessary from a side hopper, and extruding the mixture, and molding to form the desired shape.

A third example includes the steps of skimming the friction composite dispersed in the water with a net, drying and making a sheet, press-forming the sheet with a hot press machine, and forming the resultant sheet to the desired friction material with cut and grind.

EXAMPLE

Examples of the invention are explained in detail but are not limited to the exemplary cases.

Example 1

Figure 3:
FIG. 3 is a SEM micrograph of a potassium titanate manufactured with a method of the present invention.

8.7 kg of aggregates of titanium oxide, the aggregates having an average particle diameter of 0.8 mm (FIG. 1), 2.7 kg of potassium carbonate powder, 447 g of titanium powder, and 897 g of wood waste were charged into a vibration mill (FV250: Product of CHUO KAKOHKI CO., Ltd.). The vibration mill had an internal volume of 250 L, a diameter of 19 mm, a length of 1430 mm, 3200 g/rod, and 3010 kg of SS made cylindrical rod media. After addition of 65 g of methanol, the charged material was ground for 15 min at 80° C. with vibration amplitude of 8 mm and a number of frequency of 1000 rev/min to form a mixture. 500 g of the mixture was charged into a ceramic reaction vessel with an upper portion opened. The ceramic vessel was put inside an electrical furnace and heated up from room temperature (hereafter referred to RT) to 1050° C. by 12 hours, and sintered for 5.5 hours at the temperature of 1000-1100° C. The sintered material was cooled-down to RT by 13 hours and removed from the furnace. FIG. 3 shows a SEM micrograph of the sintered material or the aggregated potassium titanate. The aggregates of the sintered material were pulverized with a pulverizer (PULVERIZER: Product of Hosokawa Micron Group) to form a desired shaped sintered material S.

The pulverized sintered material had a rod, a columnar, or a cylindrical shape. Each particle had an average minor axis of 3.0 μm, an average length (average major axis) of 5.9 μm, and an average aspect ratio of 1.97. An X-ray diffraction analysis of the sintered material showed a single phase crystal of potassium hexatitanate and did not detect an unreacted titanium oxide. It is apparent that the method of the present invention easily manufactures the potassium titanate of the desired composition. The particles mostly include the recommended shape of WHO, which excludes a fiber shaped compound having the minor axis of at most 3 μm, the average length of at least 5 μm, and the aspect ratio of at least 3.

Example 2

The aggregates of the titanium oxide, the aggregates having the average diameter of 1.5 mm instead of 0.8 mm (Example 1), were utilized. The steps were the same as Example 1. The sintered body had the average minor axis of 3.2 μm, the average length (average major axis) of 6.0 μm, and the average aspect ratio of 1.88. The X-ray diffraction analysis showed the single phase crystal of potassium hexatitanate and the unreacted titanium oxide was not detected.

Example 3

7.2 kg of the aggregates of titanium oxide, the aggregates having the average diameter of 0.8 mm, 2.7 kg of potassium carbonate powder, 350 g of titanium powder, and 897 g of wood waste were charged into the vibration mill. The vibration mill had the internal volume of 200 L, the diameter of 19 mm, the length of 1430 mm, and 3010 kg of the cylindrical rod media. After addition of 65 g of methanol, the charged material was pulverized for 15 min at 80° C. to form a mixture. 500 g of the obtained mixture was charged into the ceramic reaction vessel with the upper portion opened. The ceramic vessel was put inside the electrical furnace and heated up from RT to 1050° C. by 12 hours, and sintered for 5.5 hours at the temperature of 1000-1100° C. The sintered body was cooled down to RT by 13 hours and removed from the furnace. The sintered body was pulverized with the pulverizer to form the potassium titanate.

The particles of the pulverized sintered body had the average minor axis of 3.2 µm, the average length (average major axis) of 6.2 µm, and the average aspect ratio of 1.9. The X-ray diffraction analysis showed peaks of potassium hexatitanate and potassium tetratitanate, and the unreacted titanium oxide was not detected. The method easily manufactured the desired potassium titanate and contains a plenty of the shape conforming to WHO.

Example 4

Figure 4:
FIG. 4 is a SEM micrograph of a potassium titanate manufactured with the method of the present invention under a different sintering condition.

500 g of the mixture same as Example 1 was charged into the ceramic reaction vessel, put into the electrical furnace and heated up from RT to 1150° C., and sintered at 1100-1200° C. for 5.5 hours. The sintered body was cooled down to RT and was removed from the furnace. The heating-up rate and cooling-rate were same as Example 1. FIG. 4 shows a SEM micrograph of the sintered body or the aggregates of the potassium titanate. The sintered body was the aggregates and pulverized with the pulverizer to form the desired size.

The particles of the pulverized sintered body had the rod or columnar shape, including the major axis being about equal to the minor axis. The particles had the average minor axis of 4.0 µm, the average length (average major axis) of 15 µm, and the average aspect ratio of 3.7. The X-ray diffraction analysis showed a single phase of potassium hexatitanate, and the unreacted titanium oxide was not detected. It was apparent that the method of the present invention easily manufactured the potassium titanate of the desired composition and shape.

Example 5

Figure 5:
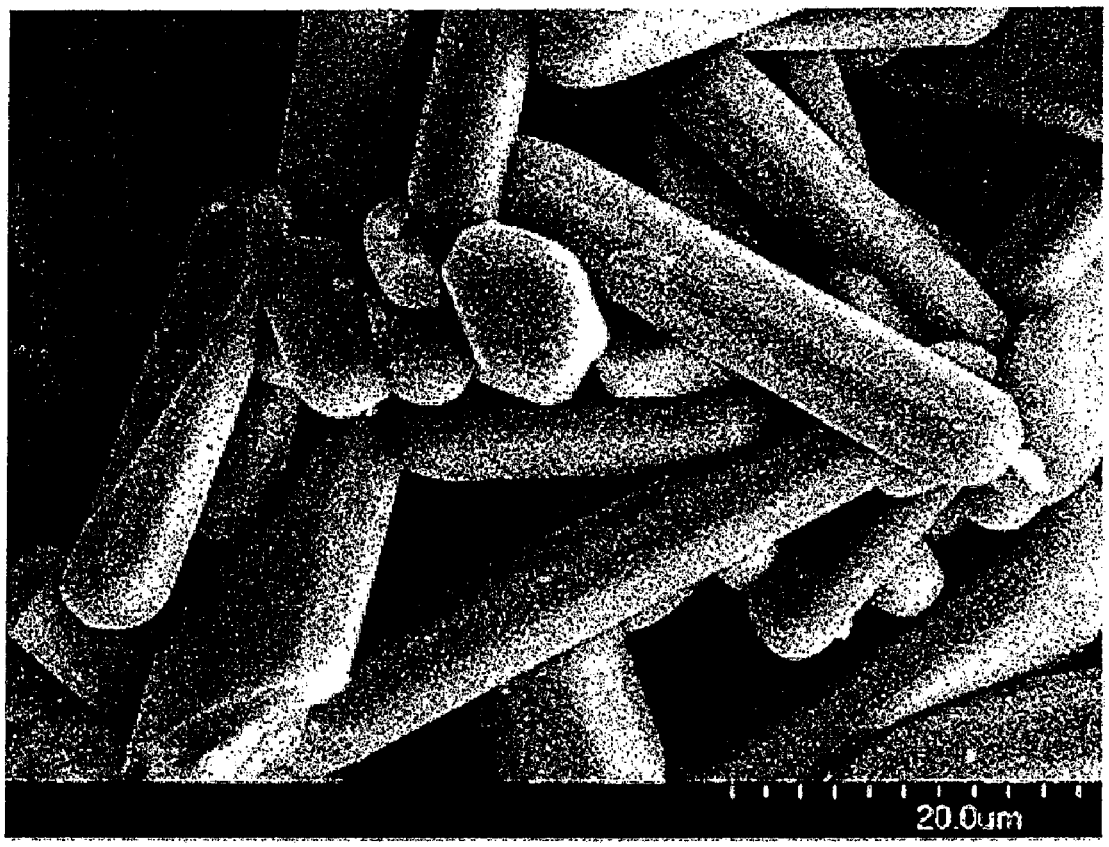
FIG. 5 is a SEM micrograph of a potassium titanate manufactured with the method of the present invention under a different sintering condition.

500 g of the mixture same as Example 1 was charged into the ceramic reaction vessel, put into the electrical furnace and heated up from RT to 1250° C., and sintered at 1200-1300° C. for 5.5 hours. The sintered material was cooled down to RT and was removed from the furnace. The heating-up rate and cooling-rate were same as Example 1. FIG. 5 shows a SEM micrograph of the aggregates of the sintered body. The aggregated sintered body was pulverized with the pulverizer to form the desired size.

The particles of the pulverized sintered body had the rod or columnar shape, including the major axis being about equal to the minor axis. The particles had the average minor axis of 6 µm, the average length (average major axis) of 27 µm, and the average aspect ratio of 4.5. The particles with the minor axis of 3-10 µm and major axis of 5-45 µm were included by at least 50%. The sintered body had the minor axis of at least 5 µm and the average length (average major axis) of at least 20 µm with the relatively large rod or columnar shape. The X-ray diffraction analysis showed the single phase of potassium hexatitanate, and the unreacted titanium oxide was not detected. It was apparent that the method of the present invention easily manufactured the potassium titanate conforming to the recommended range of WHO about the shape.

Example 6

8.9 kg of the granulations prepared with spray drying of the commercial titanium oxide in place of 8.7 kg of the aggregates of the titanium oxide of Example 1, the granulations having the average diameter of 0.3 mm, was used. The other steps were the same as Example 1. The X-ray diffraction analysis showed a single phase crystal of potassium hexatitanate, and the unreacted titanium oxide was not detected similar to Example 1. The particles had the average minor axis of more than 3 µm and were included the range recommended by WHO.

It was apparent from Examples 1-6 and FIGS. 3-5 that the higher sintering temperature provided the larger size of potassium titanate. The sintering temperatures of 1000-1100° C., 1100-1200° C., and 1200-1300° C. provided the potassium titanate with the average minor axis of about 3 µm, 4 µm, and 6 µm, and the average length (average major axis) of about 6 µm, 15 µm, and, 27 µm, respectively. The adjustment of the sintering temperature can thus control the shape of the potassium titanate. The method of the present invention provides the uniform mixing of the raw materials, so that the sintered body does not include the unreacted titanium oxide. The adjustment of the composition of the raw materials provides the desired composition of the potassium titanate.

Example 7

Figure 6:
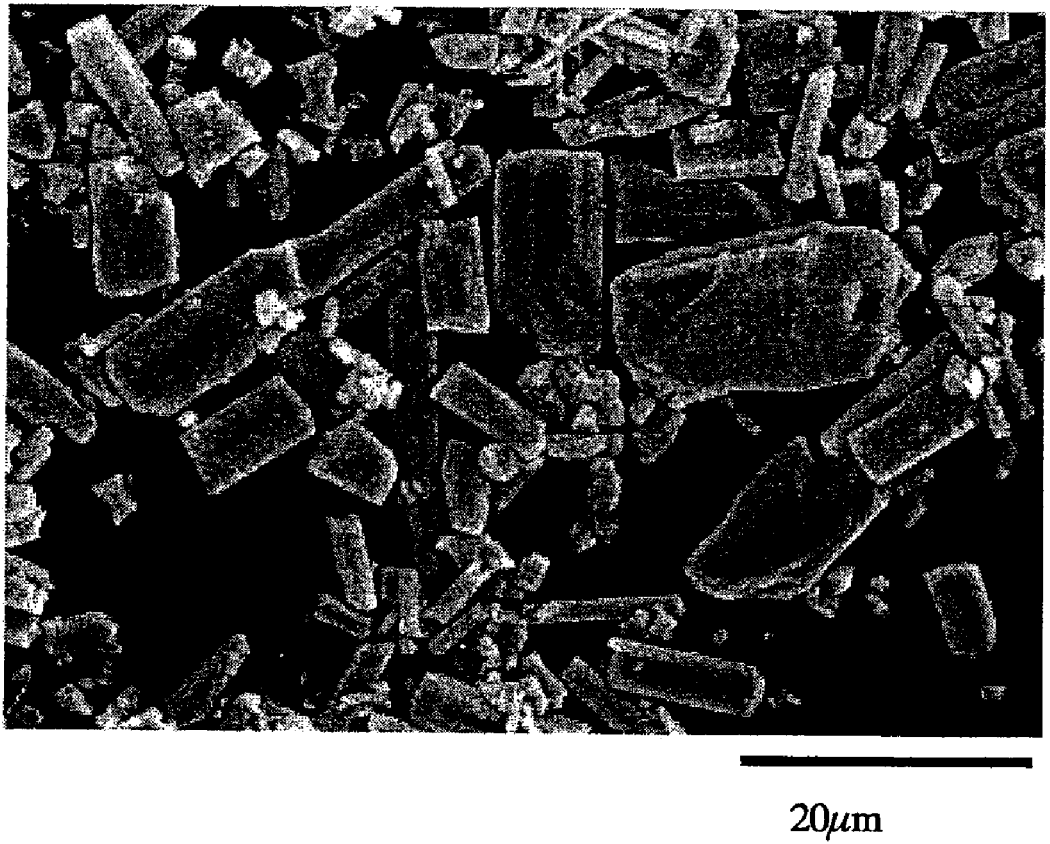
FIG. 6 is a SEM micrograph of a potassium titanate manufactured with the method of the present invention under a different sintering condition.

The only difference of the steps from Example 1 is that the mixture was heated up from RT to 1050° C. by 7 hours, sintered at the temperature of 1000-1100° C. for 5.5 hours, and cooled down to RT by 8 hours. The mixture was also sintered in the electrical furnace. The sintered body had mostly the aggregates of the fibrous shaped potassium titanate with the minor axis of at most 3 µm and the major axis of at least 5 µm. The sintered body was pulverized into the shape (sintered body T) recommended by WHO. FIG. 6 shows a SEM micrograph of the sintered body T.

The particles of the sintered body T had the rod, the columnar, or the cylindrical shape, and had the average minor axis of 1.9 µm, the average length (average major axis) of 4.1 µm, and the average aspect ratio of 2.3. The X-ray diffraction analysis showed a single phase crystal of potassium hexatitanate, and the unreacted titanium oxide was not detected. It was apparent that the method of the present invention easily manufactured potassium titanate having the desired composition. The potassium titanate had the minor axis of at most 3 µm and the major axis of at most 5 mm. The sintered body mostly included the recommended shape of WHO, which excludes the fibrous shaped compound having the minor axis of at most 3 µm, the average fiber length of at least 5 µm, and the aspect ratio of at least 3.

The change of the heating time period from 7 hours to 5.5 hours gave the same result.

Example 8

75.26 kg of aggregates of titanium oxide, the aggregates having the average diameter of 0.8 mm (FIG. 1), 48.13 kg of lithium carbonate powder, 2.21 kg of titanium powder, and 3.72 kg of wood waste were charged into the vibration mill. The vibration mill had the internal volume of 250 L, the diameter of 19 mm, the length of 1430 mm, 3200 g/rod, and 3010 kg of the SS-made cylindrical rod media (FV250: Product of CHUO KAKOHKI CO., Ltd.). After addition of 65 g of methanol, the charged material was pulverized for 15 min at 80° C. with vibration amplitude of 8 mm and the number of frequency of 1000 rev/min to form a mixture. 5 kg of the obtained mixture was charged into the ceramic reaction vessel with the upper portion opened. The ceramic vessel was put inside the electrical furnace and heated up from the RT to 1050° C. by 12 hours, and sintered for 4 hours at the temperature of 1000-1100° C. The sintered body was cooled down to the RT by 15 hours and was removed from the furnace. The sintered body was pulverized into the desired size with the pulverizer (PULVERIZER: Product of Hosokawa Micron Group). The particles of the pulverized sintered body were scale shaped having the size of 5-16 µm. The X-ray diffraction showed that the composition was a single phase crystal of $Li_2TiO_3$, and the unreacted titanium oxide was not detected.

Comparative Example 1

Figure 12:
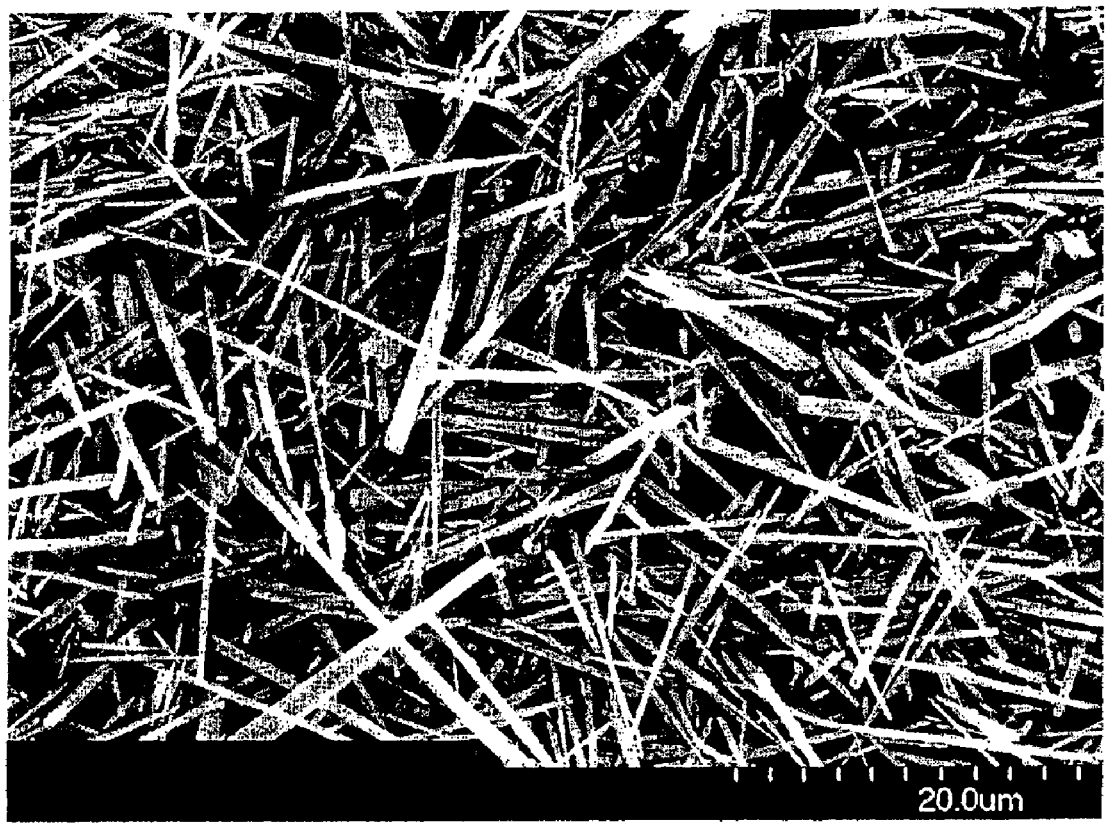
FIG. 12 is a SEM micrograph of a fibrous potassium titanate manufactured with the conventional method.

8.7 kg of a pigment titanium oxide (FIG. 2) of the average particle diameter of 1.0 µm, 5.1 kg of potassium carbonate, and 700 g of titanium powder were mixed with the V-type blender (PRODUCT of TOKUJU Co., LTD) for 15 min at RT. The average particle diameter (except the average diameter of the aggregate) was determined with the image analysis of the SEM micrograph. The vibration mill utilized in Example 1 was difficult to mix the mixture and the V-type blender was thus utilized (refer to Comparative Example 2). 500 g of the mixture was charged into the ceramic reaction vessel with the upper portion opened and put inside the electrical furnace to be sintered at 1100° C. for 3 hours. After cooling down to the RT by 13 hours and the sintered body was removed. The sintered body was immersed into 3 L of a cold water to form a slurry, and the slurry was then defibrated to separate the fiber material with a colloid mill (DISPER MILL: Product of Hosokawa Micron Group). The defibrated and separated slurry was neutralized and vacuum filtrated to form a cake material. The cake material was dried and heat treated at 800° C. for 30 min. FIG. 12 shows a SEM micrograph of the single phase of potassium hexatitanate fiber, which has the average diameter of 0.5 µm and the length of 50 µm.

Comparative Example 2

Pigment titanium oxide particles having the diameter of 1.0 µm in place of the aggregates of the titanium oxide having the average diameter of 0.8 mm, was utilized and other steps were same as Example 1. The pigment particles made the mixture of the vibration mill difficult, since ⅓-½ of the titanium oxide sticks inside the vibration rod mill. The vibration rod mill could not achieve the uniform mixture compared to other Examples. The X-ray diffraction analysis of the sintered body showed a mixed phase crystal including titanium oxide, potassium tetratitanate, and potassium hexatitanate, which indicate the residue of the unreacted titanium oxide.

Comparative Example 3

8.7 kg of titanium oxide particles having the average particle diameter of 1.0 µm, 2.7 kg of potassium carbonate powder, 447 g of titanium powder, and 897 g of wood waste were charged into the V-type blender. After addition of 65 g of methanol, the charged material was mixed for 15 min to form a mixture. 500 g of the obtained mixture was charged into the ceramic reaction vessel with the upper portion opened. The ceramic vessel was put inside the electrical furnace and heated up from RT to 1050° C. by 12 hours, and sintered for 5.5 hours at the temperature of 1000-1100° C. The sintered body was cooled down to RT by 13 hours and removed from the furnace. The sintered body was pulverized with the pulverizer (PULVERIZER: Product of Hosokawa Micron Group) to form a desired shape.

The particles of the pulverized sintered body had the average minor axis of 2.5 µm, the average length (average major axis) of 8.5 µm, and the average aspect ratio of 3.4. The X-ray analysis showed the mixed phase crystal containing titanium oxide, potassium tetratitanate, and potassium hexatitanate, which indicate the residue of the unreacted titanium oxide.

Comparative Example 4

9.1 kg of ilmenite powder, 2.7 kg of potassium carbonate powder, 447 g of titanium powder, and 897 g of wood waste were charged into the V-type blender. After addition of 65 g of methanol, the charged material was mixed for 15 min to form a mixture. 500 g of the obtained mixture was charged into the ceramic reaction vessel with the upper portion opened. The ceramic vessel was put inside the electrical furnace and heated up from RT to 1000° C. by 12 hours, and sintered at the temperature of 1000-1100° C. for 5.5 hours. The sintered body was cooled down to RT by 13 hours and removed from the furnace. The sintered body was pulverized with the pulverizer (PULVERIZER: Product of Hosokawa Micron Group) to form a desired shape.

The particles of the pulverized sintered body had the average minor axis of 2.7 µm, the average length (average major axis) of 8.6 µm, and the average aspect ratio of 3.2. The X-ray diffraction analysis showed the mixed phase crystal containing titanium oxide, potassium tetratitanate, potassium hexatitanate, and iron of 1.5 wt %, which indicates the residue of the unreacted titanium oxide and the impurity (iron).

Comparative Example 5

The V-type blender was utilized in place of the vibration mill having the cylindrical rod media. Other steps were same as Example 1. The uniform mixing was not achieved. The X-ray analysis of the sintered body showed the mixed phase crystal containing titanium oxide, potassium tetratitanate, and potassium hexatitanate, which indicate the residue of the unreacted titanium oxide.

Example 9

Preparation of Friction Material 15 parts by weight of the potassium titanate of Example 1, 3 parts by weight of the aramid fiber with 3.0 mm length (Kevlar pulp: Product of Toray-DuPont Co., Ltd.), 10 parts by weight of the binding agent (phenol resin), 9 parts by weight of the organic addition agent (cashew dust), 10 parts by weight of the graphite lubricant agent, 8 parts by weight of copper powder, and 30 parts by weight of barium sulfate were thoroughly mixed with a mixer (EIRICH Intensive Mixer: Product of EIRICH Co., Ltd.) and charged into the die. After dyeing (condition: 150 kgf/cm$^2$, 170° C., 5 minutes), the molding was removed and heat treated at the temperature of 180° C. for 3 hours. The heat treated molding was polished to form the friction material of the present invention. The organic addition agent, the lubricant agent, and the oxide powders were the conventional materials, respectively.

The obtained frictional material was evaluated as the brake pad with respect to friction performance with a full size dynamo test conforming to C406 of JASO (Japan Aseismic Safety Organization). TABLE 1 shows the result. The test apparatus and the measurement condition are given below.

test apparatus: single type full size dynamo test apparatus
test condition:
motor vehicle: CAMRY (Product of TOYOTA MOTOR CORPORATION)
tire size: 185/70/SR13
effective radius of tire: 287 mm
inertia: 44.1 kg·m$^2$ front brake:
 type: PD51
 cylinder diameter: 51 mm
 effective rotor radius: 96.5 mm
 rotor size: 243 mm
 rotor thickness: 18.0 mm
 type: ventilated Example 10

The friction material was prepared with the same method as Example 9 with the potassium titanate of Example 3 and the obtained result is shown in TABLE 1.

Comparative Example 6

The friction material was prepared with the same method as Example 9 with the potassium titanate of Comparative Example 1 and the obtained result is shown in TABLE 1.

TABLE 1

| | | Example 9 | Example 10 | Comparative Example 6 |
|---|---|---|---|---|
| friction coefficient (deceleration of 6.0 m/s$^2$) | 50 km/h | 0.395 | 0.394 | 0.394 |
| | 100 km/h | 0.379 | 0.328 | 0.315 |
| | 130 km/h | 0.338 | 0.331 | 0.328 |
| | 150 km/h | 0.399 | 0.379 | 0.351 |

TABLE 1 shows that the friction material of the potassium titanate manufactured with the present invention has the higher friction coefficient compared to the conventional potassium titanate. The friction material of the present invention has a good brake efficiency and a stable value between the speeds (speed spread) as well as the friction coefficient, and is thus suitable to the brake pad having the good friction performance.

Example 11

80 kg of the sintered body S of Example 1, 0.8 kg of the ethylcellulose-type binder (CELUNA WN$_4$O$_5$: Product of CHUKYOYUSHI Co., Ltd.), and 0.4 kg of the special ammonium salt of polycarboxylic acid (KE-511: Product of GOO Chemical Co., Ltd.) as the addition agent, were dispersed in 80 kg of water as the solvent while stirring to form a slurry of a sintered body S. The slurry was spray dried with the disk-type dryer. The condition of the spray drying was 15,000 rpm, which is a speed of rotation of atomizer, at a hot air temperature of 250° C. The spray dried particles were heat treated in the electrical furnace at 900° C. for 2 hours. FIG. 7 shows a SEM micrograph of the resultant hollow body particle. The hollow body particles each had diameter (outer diameters) of 50-100 μm. The fracture strength of the hollow body particles was measured with a hardness meter (Digital Hardness Meter KHT-40N: Product of Fujiwara Scientific Co., Ltd.). A few grams of the hollow body particles were inserted into the cylindrical test container of the diameter of 2 mm. The measured value was 3.8 kg/cm$^2$. The SEM micrograph (FIG. 7) clearly showed that the potassium titanate particles forming the hollow body particle were completely bound together at contact portions.

15 parts by weight of the hollow body particles of the potassium titanate, 3 parts by weight of the aramid fiber with the length of 3.0 mm (Kevlar pulp: Product of Toray-DuPont Co., Ltd.), 10 parts by weight of the binding agent (phenol resin), 9 parts by weight of the organic addition agent (cashew dust), 10 parts by weight of the graphite lubricant agent, 8 parts by weight of copper powder, and 30 parts by weight of barium sulfate were sufficiently mixed with the mixer (Eirich Intensive Mixer: Product of EIRICH Co., Ltd.) and charged into the die. The mold condition was 300 kgf/cm$^2$, 150° C., and 5 minutes. The removed molding was heat treated at 160° C. for 1 hour and further at 210° C. for 5 hours. The molding was polished to form the friction material of the present invention. The organic addition agent, the lubricant agent, and the oxide powder were the conventional materials. The obtained frictional material was measured about the porosity and also the friction performance (friction coefficient) with the friction test conforming to JASO C 406 (dynamometer test for motor vehicle brake). TABLE 2 shows the result.

Example 12

The friction material was prepared with the particles of the potassium titanate of Example 1 (see FIG. 3, the sintered body S having the rod, the columnar, and/or the cylindrical shape) in place of the hollow body particle of the potassium titanate of Example 11 (FIG. 7). The other steps were the same as Example 10. The porosity of the friction material was measured similar to Example 11. TABLE 2 shows the result.

Comparative Example 7

The hollow body particles of the potassium titanate were manufactured with the same steps as Example 11 except that the heat treatment in the electrical furnace was changed from 900° C. to 700° C. after spray drying the slurry. The obtained hollow body particles had the size (outer diameter) of 50-100 μm. The fracture strength of the hollow body particles was measured with the hardness meter (Digital Hardness Meter KHT-40N: Product of Fujiwara Scientific Co., Ltd.) and the measured value was 1.5 kg/cm$^2$. The SEM observation revealed that a part of the adjacent potassium titanate particles forming the relevant hollow body particle was not bound. The friction material was prepared with the hollow body particle similar to Example 11, and the porosity and the abrasion loss were measured. TABLE 2 shows the result.

TABLE 2

| evaluated item | Example 11 | Example 12 | Comparative Example 7 |
|---|---|---|---|
| porosity (%) | 11.2 | 10.6 | 10.3 |
| abrasion loss (mm) | 0.894 | 1.105 | 1.103 |

It was apparent that the hollow body particle of the potassium titanate increased the porosity of the friction material. It is assumed that when the hollow body particles of the friction material of the present invention are mixed with other materials, the shape of the hollow body particles are remained due to the fracture strength. The friction material utilizing the hollow body particles of the present invention improves the fade resistance and reduces the noise.

Example 13

The hollow body particles of potassium titanate were manufactured with the same steps as Example 11 except that the temperature of the heat treatment in the electrical furnace was changed from 900° C. to 1200° C. after spray drying. The obtained hollow body particles had the size (outer diameter) of 50-100 μm.

The fracture strength of the hollow body particles was 7.8 kg/cm$^2$, which was measured with the digital hardness meter (KHT-40N: Product of Fujiwara Scientific Co., Ltd.). The SEM observation revealed that the adjacent potassium titanate particles forming the associated hollow body particle were completely bound together at the contact portions.

Example 14

The hollow body particles of potassium titanate were manufactured with the same steps as Example 11 except that the temperature of the heat treatment in the electrical furnace was changed from 900° C. to 800° C. after spray drying. The obtained hollow body particles had the size (outer diameter) of 50-100 μm.

The fracture strength of the obtained hollow body particles was 3.2 kg/cm$^2$, which was measured with the digital hardness meter (KHT-40N: Product of Fujiwara Scientific Co., Ltd.). The SEM observation revealed that the adjacent potassium titanate particles forming the associated hollow body particle were completely bound together at the contact portions.

Comparative Example 8

The hollow body particles of potassium titanate were manufactured with the same steps as Example 10 except that the mixture was not heat treated in the electrical furnace. The obtained hollow body particles had the size (outer diameter) of 50-100 μm.

The fracture strength of the obtained hollow body particles was 0.5 kg/cm$^2$, which was measured with the digital hardness meter (KHT-40N: Product of Fujiwara Scientific Co., Ltd.). The SEM observation revealed that the adjacent potassium titanate particles forming the associated hollow body particle were not partly bound at the contact portions.

Example 15

Figure 8:
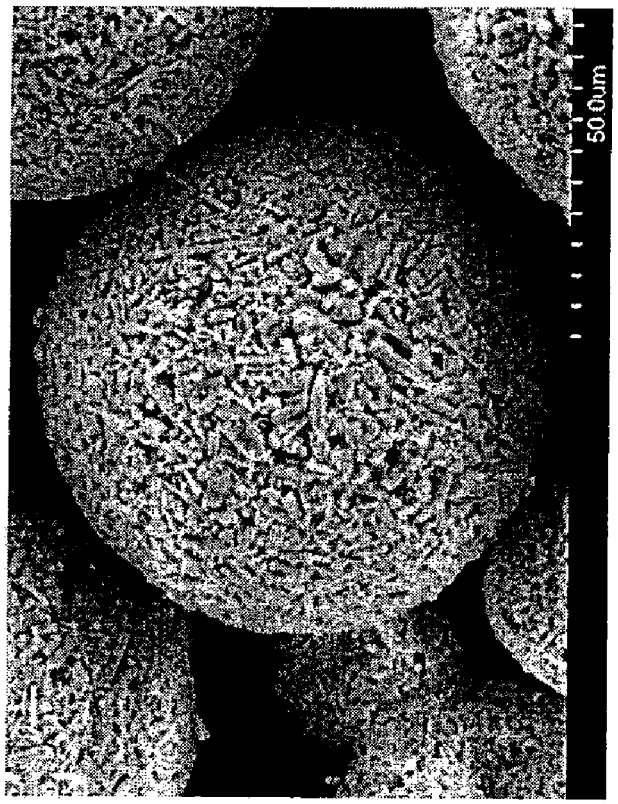
FIG. 8 is a SEM micrograph of a hollow body particle of the alkali metal titanate manufactured with a different method of the present invention.
Figure 8:
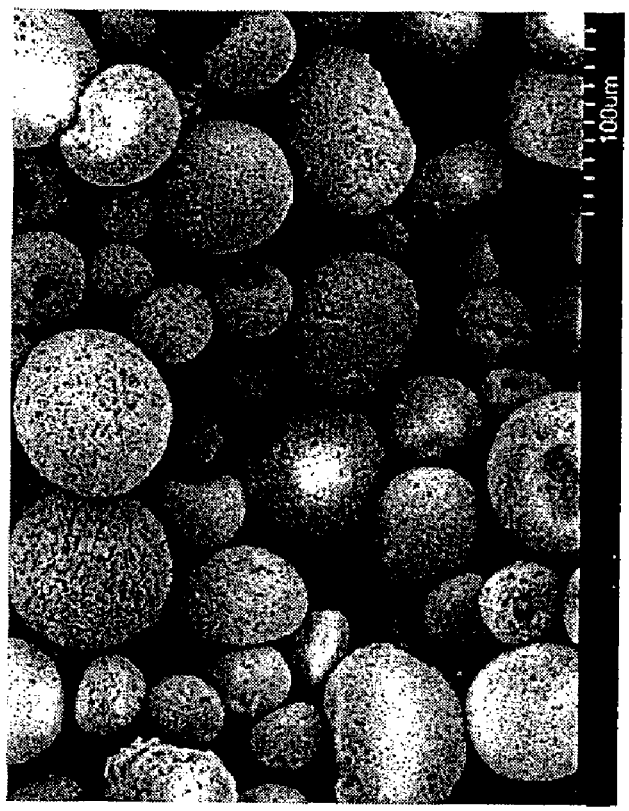

The hollow body particles were manufactured with the sintered body T of Example 7 in place of the sintered body S of Example 11. Other steps were same as Example 11. FIG. 8 shows the SEM micrograph of the obtained hollow body particles having the size (outer diameter) of 30-70 μm. The fracture strength of the obtained hollow body particles was 2.5 kg/cm$^2$, which was measured with the digital hardness meter (KHT-40N: Product of Fujiwara Scientific Co., Ltd.). The SEM observation (FIG. 8) revealed that the adjacent potassium titanate particles forming the associated hollow body particle were completely bound together at the contact portions.

Example 16

Figure 9:
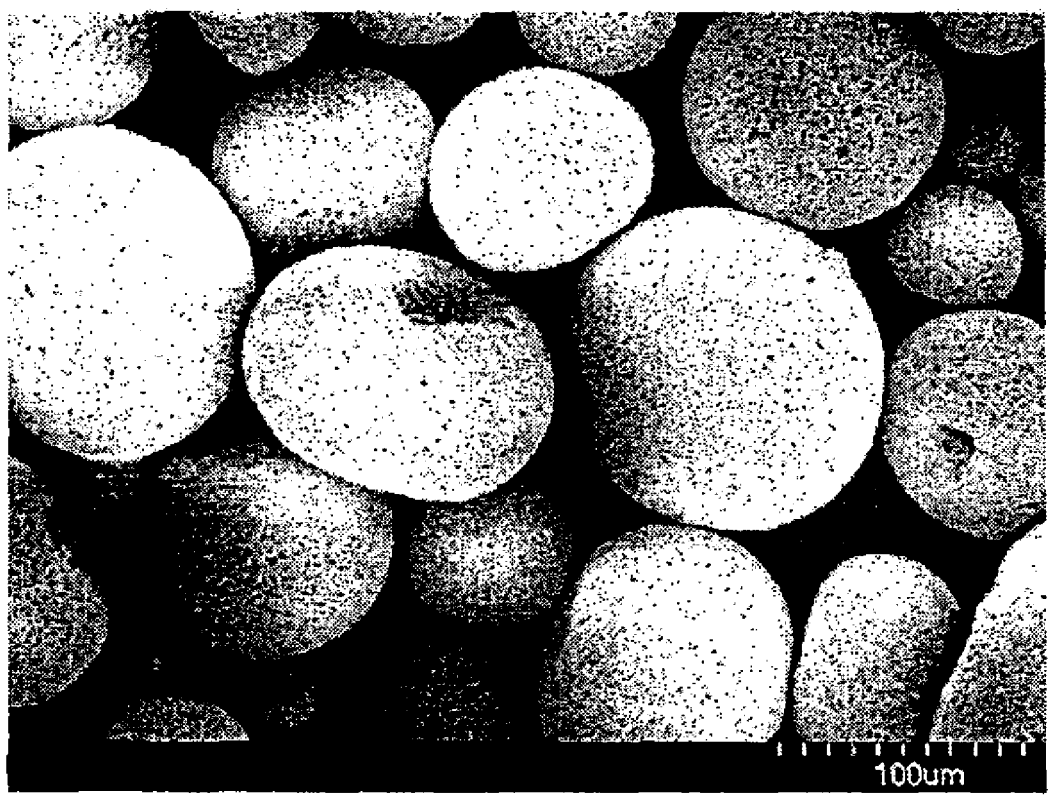
FIG. 9 is a SEM micrograph of a hollow body particle of the alkali metal titanate manufactured with a different method of the present invention.

The hollow body particles were manufactured with the steps of Example 15 except that the spray drying condition was changed to 10,000 rpm and the hot air temperature of 250° C. FIG. 9 shows the SEM micrograph of the obtained hollow body particles. The hollow body particles had the size (outer diameter) of 60-100 μm. The fracture strength of the obtained hollow body particles was 3.0 kg/cm$^2$, which was measured with the digital hardness meter (KHT-40N: Product of Fujiwara Scientific Co., Ltd.). The SEM observation (FIG. 9) revealed that the adjacent potassium titanate particles forming the associated hollow body particle were completely bound together at the contact portions.

Example 17

Figure 11:
FIG. 11 is an image of Zr in the SEM micrograph attached with EPMA (Electron Prove Micro Analyzer) of the hollow body particle of FIG. 10.

10 kg of the sintered body S of Example 1, 0.3 kg of zircon (ZrSiO$_4$) with Mohs hardness of about 7.5, 0.2 kg of ethylcellose type binder (CELUNA WN$_4$O$_5$: Product of CHUKYO YUSHI CO., Ltd.), and 0.1 kg of the specific ammonium salt of polycarboxylic acid as the addition agent (KE-511: Product of GOO Chemical Co., Ltd.) were dispersed in 10 kg of water of the solvent while stirring to form the slurry of the sintered body S. The slurry was spray dried with the disk-type dryer. The spray dry was carried out at 10000 rpm with the atomizer disk at the hot air temperature of 250° C. The spray-dried material was heat treated in the electrical furnace at 900° C. for 2 hours. FIG. 10 shows the SEM micrograph of the hollow body particle, which had the size (outer diameter) of 50-100 μm. FIG. 11 shows an image of Zr of the hollow body particle at the different regions measured with the SEM attached with Electron Probe Micro Analyzer (EPMA). Black portions of FIG. 11 indicate the zircon. It is apparent that the zircon is unifromly distributed over the hollow body particle. The fracture strength of the obtained hollow body particles was 3.8 kg/cm$^2$, which was measured with the digital hardness meter (KHT-40N: Product of Fujiwara Scientific Co., Ltd.). The SEM observation revealed that the adjacent potassium titanate particles forming the associated hollow body particle were completely bound together at the contact portions.

15 parts by weight of the hollow body particles of the obtained potassium titanate, 3 parts by weight of the aramid fiber with length of 3.0 mm (Kevlar pulp: Product of Toray-DuPont Co., Ltd.), 10 parts by weight of the binding agent (phenol resin), 9 parts by weight of the organic addition agent (cashew dust), 10 parts by weight of the graphite lubricant agent, 8 parts by weight of copper powder, and 30 parts by weight of barium sulfate were sufficiently mixed with the mixer (EIRICH Intensive Mixer: Product of EIRICH Co., Ltd.) and charged into the die. The molding was carried out at the condition of 300 kgf/cm$^2$, 150° C., and 5 minutes. The removed molding was heat treated at 160° C. for 1 hour and further at 210° C. for 5 hours, and the heat treated molding was polished to form the friction material. The organic addition agent and the lubricant agent were the conventional agents. The prepared friction material was measured about the porosity. The friction materials were measured about the friction performance such as the friction coefficient and the surface damage of the opposite side conforming to JASO C 406 "dynamometer test for motor vehicle brake". The surface damage of the opposite side was macroscopically determined with respect to the abrasion. TABLE 3 shows the result with Example 11.

Comparative Example 9

The hollow body particles of Example 17 were manufactured without addition of zircon (ZrSiO$_4$) with Mohs hardness of about 7.5. 0.75 parts by weight of the zircon (ZrSiO$_4$, M.h: about 7.5) was added when the friction material was prepared. The other steps were same as Example 17. TABLE 3 shows the result. It was apparent that Example containing less zircon had the similar friction coefficient as Comparative Example 9.

Example 18

The hollow body particles were manufactured with the same steps as Example 17 except 0.1 kg of zircon (ZrSiO$_4$, M.h: about 7.5). The fracture strength of the obtained hollow body particles was 3.8 kg/cm², which was measured with the digital hardness meter (KHT-40N: Product of Fujiwara Scientific Co., Ltd.). The SEM observation revealed that the adjacent potassium titanate particles forming the associated hollow body particle were completely bound together at the contact portions. The friction material was prepared with the obtained hollow body particles similar to Example 17 and measured about the friction coefficient.

TABLE 3

| Evaluated Term | Example 17 | Example 11 | Comparative Example 9 | Example 18 |
|---|---|---|---|---|
| Porosity (%) | 11.2 | 11.2 | 11.2 | 11.2 |
| Abrasion loss (mm) | 0.86 | 0.89 | 0.89 | 0.87 |
| Friction coefficent | 0.42 | 0.39 | 0.42 | 0.42 |
| Opposite Surface Damage | fair | excellent | Fair | good |

TABLE 3 shows that the hollow body particles containing zircon has the friction coefficient higher than the hollow body particles without zircon (Example 11). The adjustment of the amount of zircon reduces the surface damage of the opposite side while keeping the high friction coefficient. It was found that fused alumina (M.h: about 9) or $CeO_2$ (M.h: about 9) were also effective as well as zircon.

INDUSTRIAL APPLICABILITY

The method of manufacturing the alkali metal titanate of the present invention provides the simple steps, resulting in the low cost production. The method of the present invention easily manufactures the hollow body particles having the spherical structure of the alkali metal titanate. The potassium titanate manufactured with the present invention contains less fibrous shape. The manufactured potassium titanate of the present invention has the rod, the columnar, the cylindrical, the rectangular, or the plate shape. The hollow body particles each have the shell structure. The products have the good flowability and are adapted for the friction material having the stable friction coefficient and friction resistance from low temperature to high temperature. The friction material of the present invention is thus adapted for the brake member material utilized for motor vehicle, train, aircraft, and various industrial equipments. The brake member material is, for example, the clutch fading material and the brake material such as brake lining or disk pad. The present invention allows the uniform mixture of the titanate compound and the lithium compound of the raw materials so that the lithium titanate of the desired composition can be manufactured with low cost and can be adapted for the electrode material of the secondary battery of lithium ion.

The invention claimed is:

1. A method of manufacturing an alkali metal titanate, comprising the steps of:
    mixing, using a vibration rod mill, an aggregate or a granulation of titanium oxide and potassium compound, the aggregates or the granulation of the titanium compound having an average particle diameter of 0.1-10 mm; and
    sintering the mixture to manufacture potassium tetratitanate or potassium hexatitanate.

2. The method as claimed in claim 1, wherein the potassium compound is potassium carbonate or potassium hydroxide.

3. The method as claimed in claim 1, wherein the mixing is performed with an addition agent to prevent sticking or coalescence during mixing.

4. The method as claimed in claim 3, wherein the addition agent is alcohol.

5. The method as claimed in claim 1, wherein the mixing is performed with an addition of titanium metal powder or titanium hydride powder.

6. The method as claimed in claim 1, wherein the sintering is performed at a temperature between 800° C.-1300° C.

7. The method as clamed in claim 6, wherein the heating-up rate on the mixture is 0.5° C.-2° C./min and the sintering temperature is between 1000° C. and 1300° C.

8. The method as claimed in claim 6, wherein the heating-up rate on the mixture is 2° C.-5° C./min and the sintering temperature is between 1000° C. and 1300° C.

9. The method as claimed in claim 1, wherein the potassium tetratitanate or the potassium hexatitanate has a rod, a columnar, or a cylindrical shape.

* * * * *

UNITED STATES PATENT AND TRADEMARK OFFICE
CERTIFICATE OF CORRECTION

PATENT NO. : 8,398,952 B2
APPLICATION NO. : 12/593197
DATED : March 19, 2013
INVENTOR(S) : Tanimizu et al.

It is certified that error appears in the above-identified patent and that said Letters Patent is hereby corrected as shown below:

In the Specifications:

Column 10, line 33 "C./rain to 5° C./rain" should read -- C./min to 5° C./min --

Column 21, line 42 "$WN_4O5$" should read -- WN4O5 --

Column 24, line 3 "$WN_4O5$" should read -- WN4O5 --

Signed and Sealed this
Thirteenth Day of August, 2013

Teresa Stanek Rea
*Acting Director of the United States Patent and Trademark Office*